United States Patent [19]
Courbot

[11] 3,983,970
[45] Oct. 5, 1976

[54] DRUM BRAKE

[75] Inventor: Pierre Courbot, Villiers-le-Bel, France

[73] Assignee: The Bendix Corporation, South Bend, Ind.

[22] Filed: Aug. 14, 1975

[21] Appl. No.: 604,863

[30] Foreign Application Priority Data
Sept. 17, 1974 France .......................... 74.31327

[52] U.S. Cl. .................... 188/79.5 B; 188/196 B
[51] Int. Cl.² .................................... F16D 65/54
[58] Field of Search .................. 188/79.5 B, 79.5 P, 188/196 B

[56] References Cited
UNITED STATES PATENTS
| | | | |
|---|---|---|---|
| 2,034,922 | 3/1936 | Presnell | 188/79.5 B |
| 2,301,272 | 11/1942 | Goepfrich | 188/79.5 B |
| 2,570,398 | 10/1951 | Smith | 188/79.5 B |
| 3,339,678 | 9/1967 | Burnett | 88/79.5 P |

Primary Examiner—Duane A. Reger
Attorney, Agent, or Firm—Ken C. Decker; William N. Antonis

[57] ABSTRACT

A drum brake is disclosed which includes an automatic adjustment mechanism which advances the brake released position of the brake shoes toward the drum to compensate for lining wear. A temperature responsive element prevents operation of the adjuster mechanism when the temperature of the brake exceeds a predetermined level, to prevent over adjustment of the brake.

7 Claims, 5 Drawing Figures

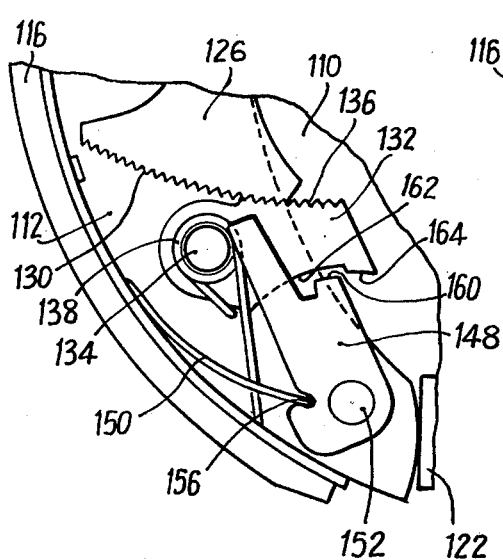
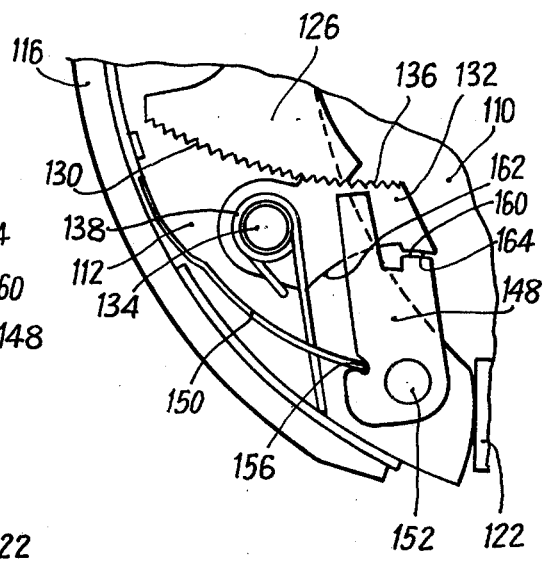
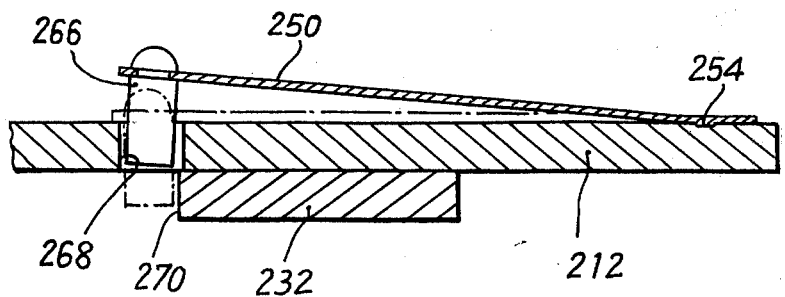

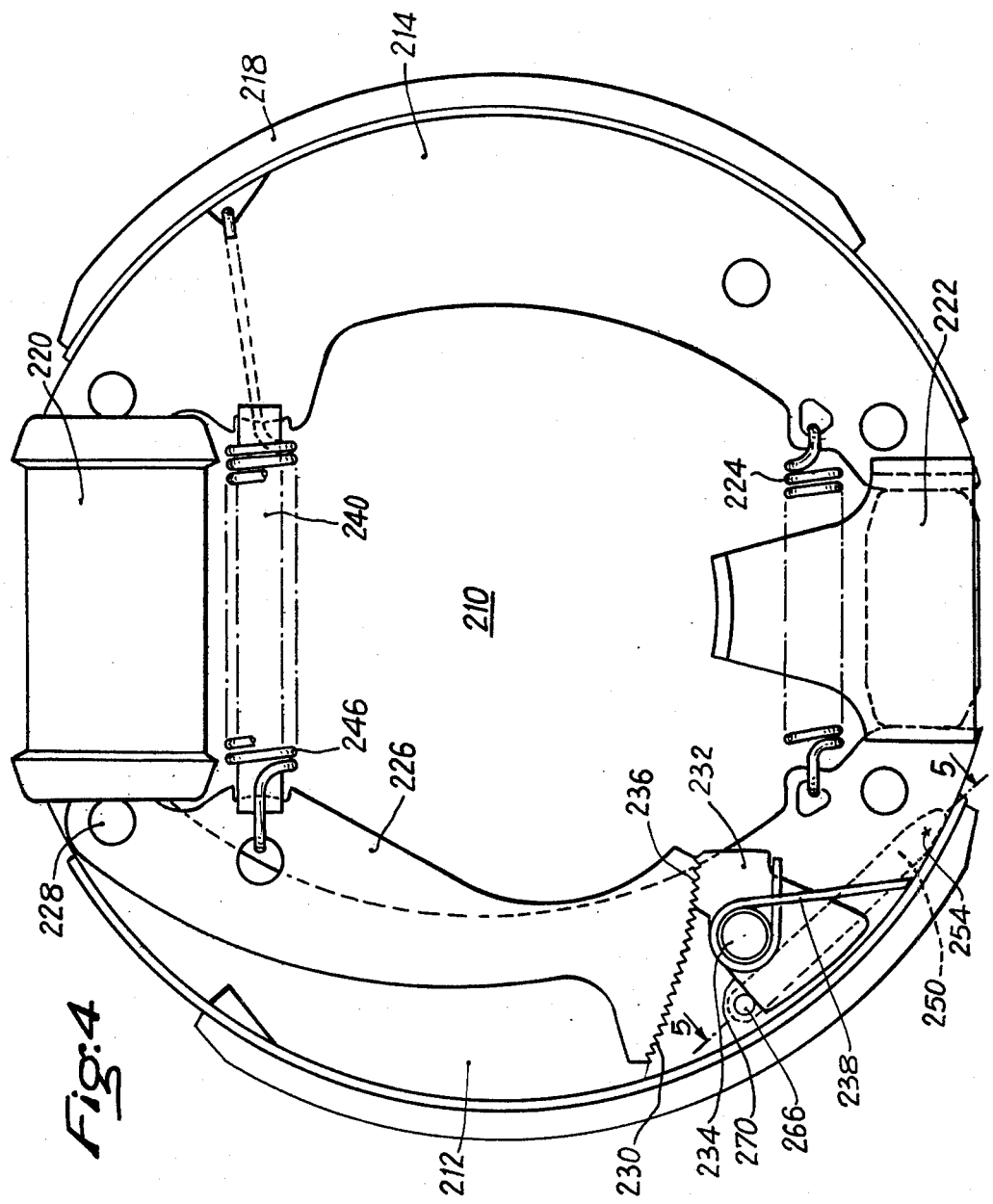

DRUM BRAKE

The invention relates to a drum brake in which the wear on the linings of the shoes is compensated automatically by a wear take-up device.

In brakes of this type, overheating, for example due to repeated application of the brake, leads to expansion of the drum and shoes and thereby changes the clearance which normally exists between these two components when the brake is cold and off. Because the wear take-up device is automatic, over-adjustment occurs when the temperature exceeds a certain value. A distressing result of overadjustment is premature wear on the linings, which brush the drum when the brake cools. This may even cause the brake to jam on.

To overcome these disadvantages, the invention proposes a drum brake comprising at least one shoe adapted to be brought into frictional contact with a rotary drum by actuating means, an adjusting lever being pivotably mounted on said shoe and comprising a toothed sector cooperating with a pawl pivotably mounted on said shoe, an operating element being adapted to act on said lever during actuation of said actuating means to pivot the adjusting lever in a brake adjusting direction, characterized in that a temperature sensitive device controls the position of a locking element which impedes pivoting of said lever or/and of said pawl when the temperature exceeds a predetermined value.

According to a preferred feature of the invention, the temperature-sensitive device comprises a bimetal element.

Various embodiments of the invention will now be described with reference to the accompanying drawings, in which:

FIG. 2 illustrates part of another embodiment of the invention on a larger scale;

FIG. 3 is a view similar to FIG 2, but showing the temperature-sensitive device in the position in which it prevents operation of the wear take-up device;

FIG. 4 is a general view of a further drum brake embodying the invention; and

FIG. 5 represents a section along line 5—5 in FIG. 4, on a larger scale.

Figure 1:
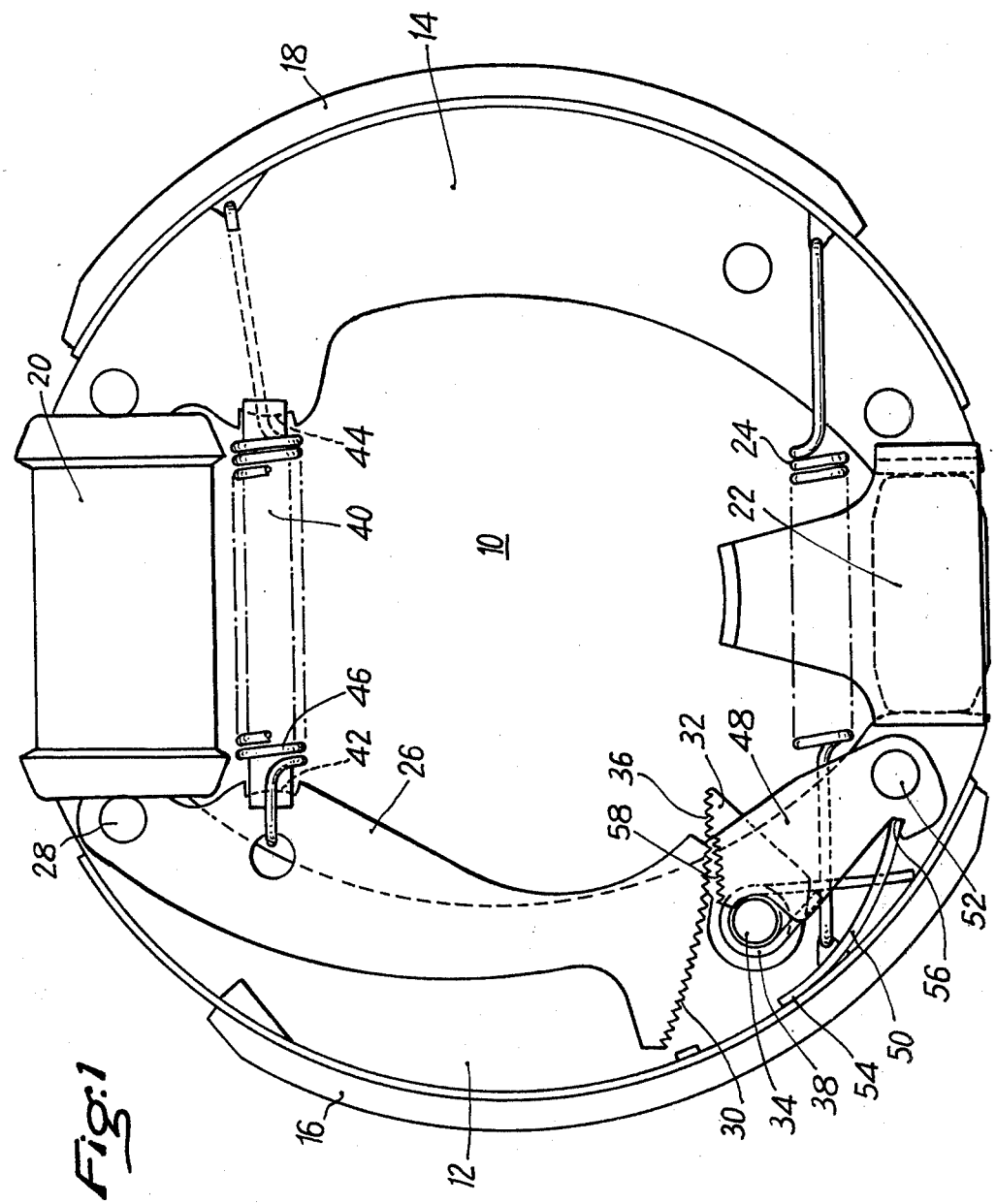
FIG. 1 is a general view of a drum brake embodying the invention.

The drum brake illustrated in FIG. 1 comprises a brake plate 10 designed to be mounted on a fixed vehicle element, for example an axle flange. Two brake shoes 12, 14 are slidably mounted on the plate 10. Each shoe comprises a curved flange carrying a lining 16 or 18 capable of cooperating with a drum (not shown). In the embodiment described, brake actuating means comprises a hydraulically operated wheel cylinder 20 provided between two adjacent ends of the brake shoes, the other two ends being urged into floating contact with a fulcrum block 22 by a spring 24.

An adjusting lever 26 is pivoted on the web of the brake shoe 12 by means of a pivot-forming rivet 28 near the wheel cylinder 20. The adjusting lever 26 has a toothed sector 30 on its free end. A pawl 32 is provided opposite the toothed sector 30 and is pivoted on the web of the shoe 12 by means of a pivot-forming rivet 34. The pawl 32 bears another toothed sector 36 and is biased by a hairpin spring 38 so that the toothed sector 36 normally cooperates with the toothed sector 30 on the adjusting lever 26. A rigid spacer 40 forming an operating element for the lever 26 is situated between the lever 26 and the shoe 14, near the wheel cylinder 20. Respective slots in each end of the spacer 40 cooperate with surfaces 42, 44 on the lever 26 and shoe 14, under the influence of a spring 46.

A wear take-up device constituted by the spacer 40, adjusting lever 26, pawl 32 and springs 38 and 46 is associated with a temperature-sensitive device comprising a bimetal element 50 and controlling the position of a locking element or lever 48. The lever 48 is pivoted on the web of the shoe 12 near the fulcrum block 22 by means of a pivot-forming rivet 52. One end of the bimetal element 50 is fixed at 54, by any appropriate means such as welding, a rivet, etc, to the flange of the shoe 12, whereas its other end enters a notch 56 in the lever 48 near the pivot 52, so that the bimetal element 50 urges the free end of the lever 48 to abut on the pivot 34. A toothed sector 58 similar to the toothed sector 36 is provided on the free end of the lever 48, and is normally clear of the toothed sector 30 when the lever is abutting on the pivot 34.

The brake just described operates as follows.

When pressure fluid is introduced into the wheel cylinder 20, the brake shoes 12, 14 move apart until their respective linings 16, 18 contact the drum (not shown). The adjusting lever 26 is biased by the spring 46 so that it retains contact with the spacer 40 and follows the motion of the shoe 14. Since at the same time the wheel cylinder 20 is urging the shoe 12 away from the shoe 14, the lever 26 tends to turn on its pivot 28 and to move the pawl 32 around its pivot 34, counteracting the force exerted by the hairpin spring 38. When the wear on the linings 16, 18 exceeds a value predetermined by the size of the teeth in the sectors 30 and 36, the teeth in the sector 36 skip one tooth in the sector 30 so that the idle position of the lever 26 is different from the position which it was occupying on the shoe 12 before the brake was applied.

The description just given of the operation of the brake does not allow for the temperature-sensitive device comprising the lever 48 and bimetal element 50, and is applicable only when this assembly is in the position shown in FIG. 1. When the brake temperature increases due for example to repeated application of the brake, the free end of the bimetal element 50 tends to move away from the flange of the shoe 12 and to turn the lever 48 clockwise in FIG. 1 on its pivot 52. This rotation brings the toothed sector 58 into engagement with the toothed sector 30 on the lever 26 when the ambient temperature reaches a predetermined value. If the brake is applied under these conditions, rotation of the adjusting lever 26 on its pivot 28 in the wear take-up direction is prevented, since the meshing of the toothed sectors 30 and 58 only allows the lever 26 to turn clockwise in FIG. 1. The arrangement therefore prevents any take-up of wear on the linings 16, 18 when the ambient temperature exceeds a predetermined value, which may correspond to the temperature at which considerable over-adjustment by the wear take-up device would be inevitable.

FIG. 2 illustrates part of a brake of the same kind as that shown in FIG. 1, and corresponding elements bear the same reference numerals as in the first embodiment, plus 100.

The temperature-sensitive device comprises a lever 148 and a bimetal element 150 mounted in the same way as the lever 48 and bimetal element 50 in the first embodiment. The bimetal element 150, by way of its free end which co-operates with a slot 156, normally biases the lever 148 so that its free end abuts on the pivot 134. In this position, an abutment surface 160 on the lever 148 is opposite a recess 162 on the pawl 132, so that the latter can turn far enough on its pivot 134 to release the teeth in the sector 136 from those in the sector 130, and so to permit rotation of the lever and the taking-up of wear. An abutment surface 164 is formed on the pawl 132 at one end of the recess 162, so that when the abutment surface 160 comes opposite the surface 164 due to rotation of the lever 148, as shown in FIG. 3, the abutment surfaces 160 and 164 prevent the pawl 132 from pivoting enough to allow teeth to be skipped between the sectors 130 and 136. This position, therefore, renders any adjustment completely impossible irrespective of the lining wear.

The drum brake described with reference to FIGS. 2 and 3 operates as follows.

When the ambient temperature is less than a predetermined temperature the temperature-sensitive device occupies the position shown in FIG. 2, so that the wear take-up device can operate as the embodiment described with reference to FIG. 1. However, when the temperature-sensitive device occupies the position shown in FIG. 3 (that is, when the ambient temperature is sufficient to move the free end of the bimetal element 150 away from the flange of the shoe 12 so that the abutment surface 160 on the lever 148 moves opposite the abutment surface 164 on the pawl 132), the clearance between the surfaces 160, 164 does not allow the pawl 132 to tilt enough to skip one or more teeth in the toothed sector 130 on the lever 126. Consequently, as in the first embodiment, the take-up of wear on the linings will be impossible as long as the ambient temperature does not fall sufficiently to return the components of the temperature-sensitive device to the position shown in FIG. 2. FIG. 4 illustrates a third embodiment of the invention in which elements corresponding to those of the brake shown in FIG. 1 are designated by the same reference numerals plus 200.

In this embodiment the temperature-sensitive device consists solely of a bimetal element 250 fixed at 254, by any appropriate means such as welding, rivetting, etc, to the web of the shoe 212. A stud 266 is mounted on the free end of the bimetal element 250. As FIG. 5 shows, the element 250 is mounted on that face of the web of the shoe 212 remote from the face bearing the pawl 232. The stud 266 engages in an aperture 268 in the web of the shoe 212 and is normally flush with the opposite face of this web, as indicated by solid lines in FIG. 5.

The pawl 232 has an abutment surface 270, normally tangential to the aperture 268 when the teeth in the sectors 230, 236 are meshing. In this position, the stud 266 does not project from the corresponding face of the web of the shoe 212, and it is therefore possible for the pawl 232 to pivot in the direction which corresponds to the take-up of wear on the brake linings, and which tends to bring the abutment surface 270 opposite the aperture 268. When the temperature increases however, the bimetal element 250 tends to occupy the position shown by chain-lines in FIG. 5, so that the stud 266 projects from that face of the shoe 212 bearing the pawl 232. All pivoting of the pawl 232 is now prevented, since its abutment surface 270 engages the stud 266 before the pawl has turned far enough for a tooth to be skipped between the sectors 230, 236. As in the other embodiments, all operation of the wear take-up device is prevented as soon as the ambient temperature is sufficiently high to change the shape of the bimetal element.

Clearly, the brakes described above have been described by way of example only, and various modifications can be made without exceeding the scope of the invention. In particular, a brake of any type other than those described with reference to FIGS. 1 and 4 an having a temperature-sensitive device which prevents operation of a wear take-up device of the type described beyond a certain temperature comes within the scope of the invention. For example, any other actuating means may be substituted for the wheel cylinder 20.

What we claim is:

1. A drum brake comprising at least one shoe adapted to be brought into frictional contact with a rotary drum by actuating means, an adjusting lever member being pivotably mounted on said shoe and comprising a toothed sector co-operating with a pawl member pivotably mounted on said shoe, an operating element being adapted to act on said adjusting lever member during actuation of said actuating means to pivot the adjusting lever member in a brake adjusting direction, wherein a temperature-sensitive device controls the position of a locking element which impedes pivoting of at least one of said members when the temperature exceeds a predetermined value, said temperature-sensitive device comprising a bimetal element.

2. A drum brake according to claim 1, wherein one end of the bimetal element is fixed to said shoe, the other end of the bimetal element controlling the position of said locking element.

3. A drum brake according to claim 2, wherein said locking element is attached to said other end of the bimetal element and is capable of engaging an abutment surface on the pawl member when the temperature exceeds the predetermined value, to prevent the pivoting of the pawl member.

4. A drum brake according to claim 3, wherein said abutment surface is substantially tangential to the edge of an aperture formed in the web of the shoe when the teeth on the pawl member are meshing with the teeth on the adjusting lever member, and covers at least partially the aperture upon pivoting of the adjusting lever member, said locking element traversing said aperture and being flush with the face of the web bearing the pawl member when the temperature is less than the predetermined value, said locking element projecting from the aperture to engage the abutment surface on the pawl member when the temperature exceeds the predetermined value.

5. A drum brake according to claim 2, wherein said locking element is a locking lever pivotably mounted on the shoe, said other end of the bimetal element engaging said locking lever to cause the latter to rotate and to bring said locking lever into engagement with a corresponding surface on at least one of said members when the temperature exceeds the predetermined value, so preventing any pivoting of the pawl member and of the adjusting lever member.

6. A drum brake according to claim 5; wherein the locking lever comprises a toothed sector capable of cooperating with the toothed sector on the adjusting lever member when the temperature exceeds said predetermined value.

7. A drum brake according to claim 5, wherein said locking lever comprises an abutment surface capable of engaging an abutment surface on the pawl member and constituting the said corresponding surface, when the temperature exceeds the predetermined value.

* * * * *